United States Patent [19] [11] 3,766,601
Heighberger [45] Oct. 23, 1973

[54] MEAT ASSEMBLING DEVICE
[76] Inventor: Robert N. Heighberger, 22230 Euclid Ave., Euclid, Ohio 44117
[22] Filed: Apr. 21, 1971
[21] Appl. No.: 135,876

[52] U.S. Cl. .................................................. 17/1 R
[51] Int. Cl. ............................................. A22c 7/00
[58] Field of Search ............................................ 17/1

[56] References Cited
UNITED STATES PATENTS
2,303,566 12/1942 Majestic ................................ 17/1 R
3,213,486 10/1965 Blake .................................... 17/1 R Primary Examiner—Lucie H. Laudenslager
Attorney—Robb & Robb

[57] ABSTRACT

The disclosure hereof is of a device for assembling meat chunks or similar particles or pieces of meat so that the same are thereafter in larger pieces whether they be retained in their assembled condition by the insertion of a stick or by other means, the device involving a housing in which the meat is deposited, means for compressing the meat, and means for inserting a stick through the compressed meat and thereafter the ejection of the meat from within the housing.

4 Claims, 6 Drawing Figures

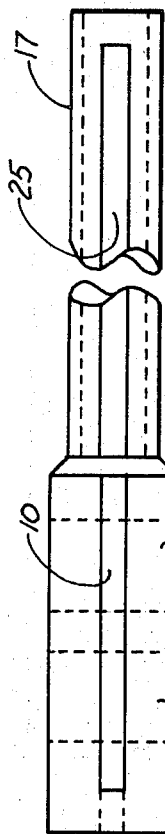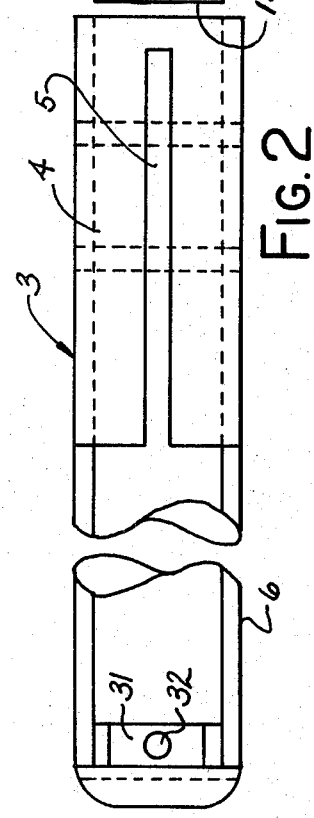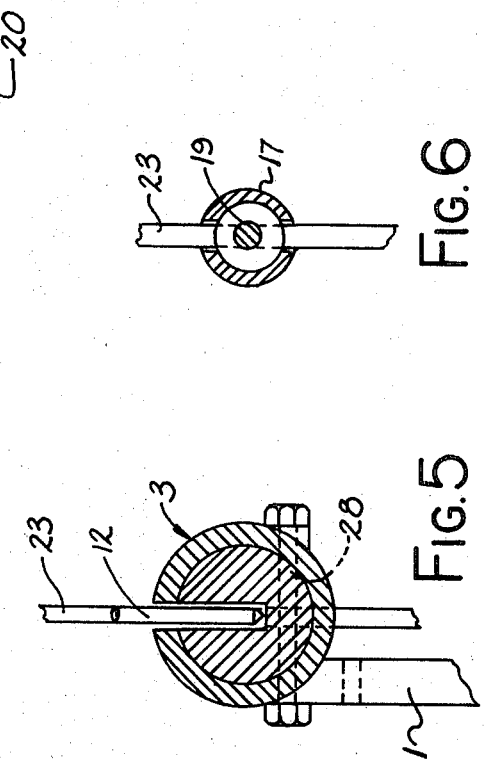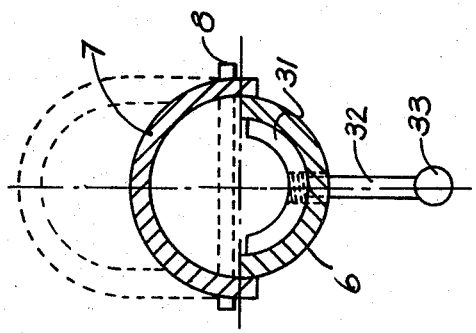

MEAT ASSEMBLING DEVICE

OBJECTS OF THE INVENTION

It is a principle object of this invention to provide a device of simplified form which is susceptible of being used for assembling meat chunks or similar meat particles or pieces involving as it does the deposit of the meat in a confined space, compressing the meat and holding the same in such space and thereafter providing for maintaining the meat in assembled condition by the insertion of a stick if necessary or by other means if found more desirable.

It is a primary object of the invention to facilitate the assembly of meat by placing the same in a suitable meat receiving section of the device, covering the same so as to confine the meat therewithin, causing a stick or skewer or the like to be driven through the meat whilst the same is held under compression and enabling the withdrawal of the assembled meat thereafter upon opening of the cover and operating suitable ejection means therefor.

A more specific object of the invention is to provide a novel arrangement wherein the meat is assembled in a hollow housing, a suitable cover is applied, a wooden skewer or similar article is deposited in a magazine and by simple motion, a lever operated to drive the skewer into the meat.

An even more particular object of the invention is to make provision for support in a magazine of a number of skewers of wood or similar nature, providing a way of compressing the meat while the skewer is being driven into the same by a plunger actuated by lever means suitably engaged therewith, all of the same being effected in a simple motion and yet effectively providing for withdrawal of the meat by ejection means when assembly is complete.

Other and further objects of the invention will be understood from a consideration of the specification appended hereto and disclosed in the drawings, wherein:

FIG. 2 is a top view of the housing, illustrating the ejecting means in position.

FIG. 3 is a top view of a piston member, used in association with the housing.

FIG. 4 is a sectional view of FIG. 1, taken about on the line 4—4 of that figure looking in the direction of the arrows.

FIG. 5 is a cross sectional view, taken about on the line 5—5 of FIG. 1, looking in the direction of the arrows, somewhat fragmentary in nature.

FIG. 6 is a vertical sectional view, taken about on the line 6—6 of FIG. 1, looking in the direction of the arrows, partly fragmentary.

DESCRIPTION OF THE INVENTION

Figure 1:
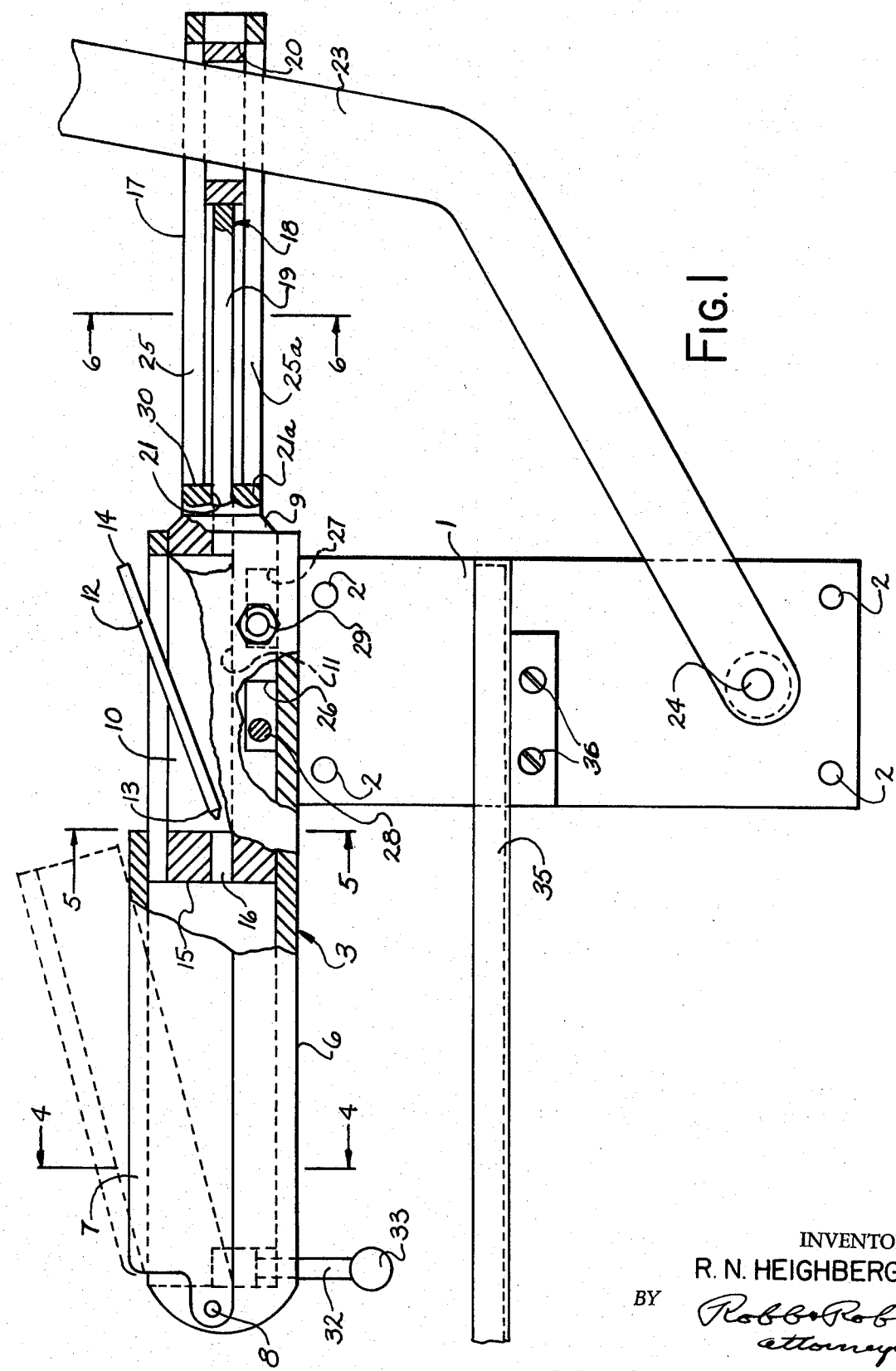
FIG. 1 is a side elevation of the device partly in section, illustrating the respective sections and portions and operating means therefor.

Referring now to FIG. 1, a suitable support of elongated generally rectilinear in nature denoted 1, is provided and in this instance shown as extending vertically with suitable holes such as 2 pierced therein to provide for mounting the same in a suitable environment such as a butcher shop or the like and on a meat block or similar location where the same may be most useful.

Suitably mounted at the upper end of the support 1 is a hollow housing 3 of tubular nature, about as illustrated in FIG. 2 from above, with a stick supply portion generally denoted 4 being of cylindrical configuration and having a slot 5 extending there-along. The housing 3 further includes a meat receiving section designated 6, in this instance being semi-circular in cross section as illustrated in FIG. 4, so as to provide a suitable area in which meat particles or chunks may be initially supported.

The meat receiving section 6 is equipped with a suitable cover 7 shown in closed condition in FIG. 1 in full lines and as though partly open in dotted lines in that figure, being hingedly connected to the housing 3 at 8.

As will be further apparent from a consideration of FIG. 4, the cover 7 is similarly arcuate in cross section as the receiving section 6, being semi-cylindrical as will be understood from this view with the pivotal arrangement at 8 being further shown.

It will thus be understood that the cover 7 may be manipulated so as to open the same up and permit the depositing of meat into the meat receiving section, whether the same be in chunks or ground, or in some other form, so as to be confined entirely therewithin.

Adverting now to FIG. 1 again, the housing 3 is provided with a compressing means formed by a piston member generally designated 9, and more particularly illustrated in FIG. 3 as being an elongated cylindrical member having a slot 10 extending longitudinally thereof and down below the center line so that the bottom of such slot suggested at 11 in dotted lines in FIG. 1 will support a suitable skewer or stick such as indicated at 12 in that figure, this being a common well-known article pointed at 13 and usually squared at the other end 14.

The piston member 9 includes the compressing face 15 at one end, through which a suitable opening 16 is arranged to receive the stick or skewer 12 previously mentioned.

The other end of the piston member 9 is of an elongated cylindrical nature likewise, somewhat smaller in diameter than the piston member 9 and denoted 17 forming part of the operating instrumentalities and being hollow so as to support therewithin a suitable plunger designated 18 having the rod part 19 thereon, with a head 20 connected thereto.

The rod 19 is adapted to extend through a suitable opening formed in a wall 21a at one end of the portion 17, whereby the plunger 18 as a whole can move backwardly and forwardly with respect to the cylindrical part 17.

As will be apparent from FIG. 7, the plunger 18 is formed with a slotted section 22 in the head 20 so as to receive an operating arm 23 therein, the arm 23 being pivotally connected at 24 to the support 1 previously mentioned.

The part 17 is slotted at its upper portion at 25 to provide for manipulation of the arm 23 and of course a similar slot diametrically arranged with respect to slot 25 and designated 25a is formed in the lower portion of the part 17 whereby the arm 23 may be moved from the position shown in FIG. 1 for example in a counter clockwise direction and carry with it the plunger 18 previously mentioned.

Since the plunger 18 includes the rod 19 thereon, and the rod 19 passes through the opening 21, this opening 21 being aligned with the opening 16 previously mentioned, and providing for movement of the stick or skewer 12, it will be apparent that similar manipulation of the lever 23 will cause the skewer or stick 12 to be moved leftwardly as viewed in FIG. 1 through the opening 16 into and through the meat in the meat receiving section 6 previously mentioned.

The cylindrical piston member 9 is equipped with transversely extending slots 26 and 27 as seen in FIG. 1 so that the member 9 as a whole, including the part 17 thereof, may be moved within limits, transverse bolts 28 and 29 being engaged with the housing 3 in a manner to limit the extent of movement of the piston member 9 and also prevent rotation thereof so that the slot 10 therein will not get out of registry with the slot 5 in the housing 3.

It will thus be apparent that when the head 20 of the plunger 19 impinges against the end 30 of the member 17, it will cause movement of the entire piston and member 17 simultaneously. This movement will cause the compressing face 15 on the end of the piston member 9 to engage the meat in the receiving section 6 and compress the meat therein. The pressure will take place after the skewer or stick 12 has been inserted in the meat, and when the arm 23 is returned to its initial position as shown in FIG. 1, the piston 9 and part 17 connected therewith will likewise be withdrawn to a position shown in that figure.

Thus, when the cover 7 is opened, the meat assembled on the stick may then be withdrawn. In order to facilitate withdrawal, a suitable ejecting means is disclosed and particularly illustrated in FIGS. 2 and 4, as comprising a semi-circular segment 31 closely conforming to the arc of the interior of the meat receiving section 6, and having a rod 32 extending downwardly therefrom terminating in a knob 33, this member being thereby susceptible of upward and downward manipulation, to expel or cause the assembled meat to be pushed upward outwardly from the meat receiving section 6, and thereafter permitted to be again seated as shown in FIG. 4.

It will thus be understood that by initially depositing meat chunks for example in the section 6, closing the cover 7 and thereafter manipulating the operating arm 23 with a skewer 12 in place in the magazine provided by the slot 10 and aligned slot 5, suitable impaling of the meat with the skewer or stick 12 will be effected.

It will be particularly useful to provide a tray such as 35 below the section 6 to prevent meat particles or chunks from dropping on the floor. Such tray may be removable by withdrawing screws 36 from their connecting position with the member 1.

I claim:

1. A meat assembling device comprising, in combination, a support, a housing connected thereto, a meat receiving section in said housing, means to gently compress meat in said meat receiving section, and means to insert a skewer through the meat in said section, and means operatively connected to said compressing means and said skewer inserting means to compress said meat and insert said skewer.

2. The combination of claim 1 wherein said means to compress the meat and the means to insert the skewer operate coaxially.

3. The combination of claim 1 wherein said meat compressing means includes movable piston means, and said means to insert the skewer includes a plunger mounted for axial reciprocal movement in said piston means.

4. The invention as defined in claim 3 further characterized by means to first actuate said plunger and thereafter actuate said piston.

* * * * *